United States Patent Office 2,971,018
Patented Feb. 7, 1961

2,971,018

QUATERNARY AMMONIUM SALTS OF (2-DI-ETHYLAMINO-1-PHENYLETHYL) BENZOATES

Seymour L. Shapiro, Hastings-on-Hudson, Louis Freedman, Bronxville, and Harold Soloway, Tuckahoe, N.Y. (all % U.S. Vitamin Corporation, 250 E. 43rd St., New York 17, N.Y.)

No Drawing. Filed Apr. 8, 1958, Ser. No. 727,035

5 Claims. (Cl. 260—459)

This invention relates to the quaternary ammonium salts of (2-diethylamino-1-phenylethyl)benzoates having the following structure:

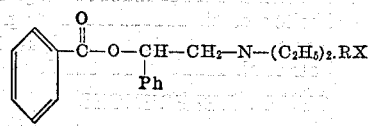

wherein RX is selected from the group consisting of methyl iodide, ethyl bromide, diethyl sulfate and propargyl bromide and wherein Ph represents phenyl.

These compounds, within the narrow and precise structural parameters stated, are useful in the therapy of Parkinson's disease, as shown by evaluation in terms of their capacity to reduce the tremors associated with administration of 1,4-dipyrrolidino-2-butyne which induces a Parkinson-like state in animals.

The specificity of structural requirements for the reduction of the tremors is shown in Table I. The compounds of this invention will be seen to be effective whereas congeners of these compounds are unsatisfactory. The results are tabulated in terms of $ED_{50}$ (the dosage in mg./kg. of mice which protects 50% of the animals from tremors) and the $LD_{min.}$ (the minimal dosage in mg./kg. which is lethal to mice on subcutaneous administration).

For performing the tremorine test, the required 1,4-dipyrrolidino-2-butyne was prepared and converted to the 1,4-dipyrrolidino-2-butyne ditartrate (tremorine ditartrate), M.P. 126–127° C.

The compound to be tested is injected subcutaneously (s.c.) in mice at levels in mg./kg. corresponding to ⅓, ⅙, ¹⁄₁₂, etc., of the minimal lethal dose. Four mice are used at each level. Ten minutes later, tremorine ditartrate is injected s.c. at a level of 30 mg./kg. One hour after the injection of tremorine the mice are observed for the absence or presence of tremors. The animal is held by the tail and observed for ten seconds and if no tremors are noted the animal is adjudged protected by the test compound. A graphic plot of the percentage of animals protected at each dosage level of the test drug is made, and the dosage level which would protect 50% of the animals is established and reported as the $ED_{50}$ (effective dose protecting 50% of the animals).

TABLE I

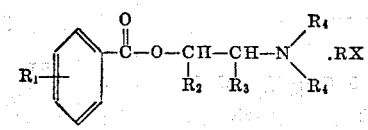

| $R_1$ | $R_2$ | $R_3$ | $R_4$ | $R_5$ | RX | $LD_{min.}$ | $ED_{50}$ |
|---|---|---|---|---|---|---|---|
| H | Ph | H | $C_2H_5-$ | $C_2H_5-$ | $CH_3I$ | 300 | 1.6 |
| H | Ph | H | $C_2H_5-$ | $C_2H_5-$ | $C_2H_5Br$ | 75 | 11 |
| H | Ph | H | $C_2H_5-$ | $C_2H_5-$ | $(C_2H_5)_2SO_4$ | 100 | 10 |
| H | Ph | H | $C_2H_5-$ | $C_2H_5-$ | $HC{\equiv}C{-}CH_2Br$ | 50 | 5.6 |

For contrast, note following results with the following congeners that are outside the invention.

| $R_1$ | $R_2$ | $R_3$ | $R_4$ | $R_5$ | RX | $LD_{min.}$ | $ED_{50}$ |
|---|---|---|---|---|---|---|---|
| H | Ph | H | $CH_3-$ | $CH_3-$ | $CH_3I$ | 250 | 80 |
| H | H | H | $C_2H_5-$ | $C_2H_5-$ | $CH_3I$ | 250 | neg. |
| H | H | H | $C_2H_5-$ | $C_2H_5-$ | $C_2H_5I$ | 200 | neg. |
| H | H | Ph | $C_2H_5-$ | $C_2H_5-$ | $CH_3I$ | 150 | neg. |
| 4-Cl | Ph | H | $C_2H_5-$ | $C_2H_5-$ | $CH_3I$ | 250 | 86 |
| 3,5-di-$CH_3O$ | Ph | H | $C_2H_5-$ | $C_2H_5-$ | $CH_3I$ | 200 | 60 |
| 3,4,5-tri-$CH_3O-$ | Ph | H | $C_2H_5-$ | $C_2H_5-$ | $CH_3I$ | 200 | 70 |

It will be noted that variations introduced cause marked reductions in the activity of closely related systems.

The (2-diethylamino-1-phenylethyl)benzoate is prepared by reaction of 2-diethylamino-1-phenylethanol made following Emerson, J. Am. Chem. Soc., 67, 516 (1945)) with benzoyl chloride.

The quaternary is prepared by reaction of RX with (2-diethylamino-1-phenylethyl)benzoate either in the presence of a suitable organic solvent such as a lower alcohol, acetonitrile, ether or nitromethane and the like, or in the absence of solvent.

The following specific examples illustrate the preparation of our compounds. The several compounds are prepared in the same manner, with the selection of starting materials providing the radicals that are to appear in the particular compound to be made.

EXAMPLE 1

*(2-diethylamino-1-phenylethyl)benzoate hydrochloride*

To a solution of 9.9 g. (0.07 mole) of benzoyl chloride in 150 ml. of refluxing benzene, there was added dropwise 13.6 g. (0.07 mole) of 2-diethylamino-1-phenylethanol. Reflux and stirring were continued for 2 hours, after which the solvent was removed, the residue of product washed with dry ether and recrystallized from isopropyl alcohol to give 15.1 g. (65%) of product, M.P. 140–142° C.

*Analysis.*—Calcd. for $C_{19}H_{23}NO_2 \cdot HCl$: C, 68.35; H, 7.25; N, 4.20. Found: C, 67.87; H, 7.46; N, 3.71.

EXAMPLE 2

(2-diethylamino-1-phenylethyl)benzoate methiodide (2-diethylamino-1-phenylethyl)benzoate hydrochloride (3.5 g.) was dissolved in water, made basic with aqueous sodium hydroxide and the formed free base extracted with ether. The ethereal solution was dried with anhydrous magnesium sulfate for 16 hours. The magnesium sulfate was removed by filtration. The free base, 3.0 g. (0.01 mole) recovered by evaporation of the ether filtrate, was dissolved in 25 cc. of acetonitrile and 2.1 g. (0.15 mole) of methyl iodide added. After standing 16 hours, the precipitated product was collected and after recrystallization from ethanol afforded 2.9 g. (66%) of product, M.P. 212–213° C.

Summary of quaternaries prepared

With the selection of reactants as described earlier herein to give the various values for RX, and with the technique illustrated in Examples 1 and 2 we have made additional quaternary salts which are shown in Table II.

TABLE II

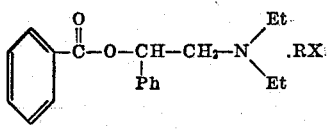

| RX | Formula | M.P., °C. |
|---|---|---|
| CH$_3$I | C$_{20}$H$_{26}$INO$_2$ | 212–213 |
| CH$_3$Cl | C$_{20}$H$_{26}$ClNO$_2$ | 164–166 |
| CH$_3$Br | C$_{20}$H$_{26}$BrNO$_2$ | 191–192 |
| CH$_3$CH$_2$SO$_4$ | C$_{21}$H$_{29}$NO$_6$S | 148–149 |
| C$_2$H$_5$I | C$_{21}$H$_{28}$INO$_2$ | 156–158 |
| C$_2$H$_5$Br | C$_{21}$H$_{28}$BrNO$_2$ | 133–136 |
| C$_2$H$_5$.C$_2$H$_5$SO$_4$ | C$_{23}$H$_{33}$NO$_6$S | 154–155 |
| HC≡CCH$_2$Br | C$_{22}$H$_{26}$BrNO$_2$ | 108–109 |
| PhCH$_2$Br | C$_{26}$H$_{30}$ClNO$_2$ | 181–183 |

For therapeutic use the quaternary ammonium salt is mixed with an extender in proportion that is ordinarily as large as required to separate the particles of the ingredient from each other and cause quick solution or dispersion of the active ingredient when contacted with the gastric juice of the stomach.

The excipient used must be non-toxic, edible or potable, and without injurious chemical effect upon the active ingredient. Examples of solid excipients that meet these requirements and may be used are lactose, sucrose, gum arabic, gum tragacanth, acacia or mixtures of them. Suitably, the solid excipient may contain also admixed magnesium stearate, talc, cellulose or two or more of these additives to promote separation of the composition from the plunger and mold used in shaping the composition into tablets. Table III shows a satisfactory formula:

TABLE III—THERAPEUTIC TABLET

| Ingredients | Weight in Mg. |
|---|---|
| Active Ingredient (quaternary ammonium salt) | 20 |
| Sugar | 150 |
| Starch | 25 |
| Acacia | 10 |
| Talc | 3 |
| Magnesium Stearate | 2 |
| Stearic Acid | 1 |

In alternative tablet compositions, the ingredients may be varied by substituting any material of a given class by any other ingredient described herein for the same purpose, or on an equal weight basis. The weight of the active ingredient may be varied from 2–50 mg.

It is to be understood that it is intended to cover all changes and modifications of the examples of the invention herein chosen for the purpose of illustration which do not constitute departures from the spirit and scope of the invention.

We claim:

1. The quaternary ammonium salt of the formula

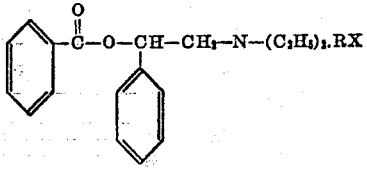

where RX is selected from the group consisting of methyl iodide, ethyl bromide, diethyl sulfate and propargyl bromide.

2. The compound of claim 1 in which RX is methyl iodide.

3. The compound of claim 1 in which RX is diethyl sulfate.

4. The compound of claim 1 in which RX is propargyl bromide.

5. The compound of claim 1 in which RX is ethyl bromide.

References Cited in the file of this patent

UNITED STATES PATENTS

| 829,374 | Fourneau | Aug. 21, 1906 |
| 2,606,205 | Shelton et al. | Aug. 5, 1952 |
| 2,673,853 | Rorig | Mar. 30, 1954 |
| 2,797,233 | Latt et al. | June 25, 1957 |

OTHER REFERENCES

Jensen et al.: Acta Chem. Scand., 2, 381–383 (1948).